United States Patent [19]
Poutanen

[11] Patent Number: 5,234,279
[45] Date of Patent: Aug. 10, 1993

[54] CONNECTOR PLATES, CONNECTOR PLATE JOINTS AND CONNECTOR PLATE STRUCTURES

[76] Inventor: Tuomo T. Poutanen, Hallituskatu 25 C 72, SF-33200 Tampere, Finland

[21] Appl. No.: 663,861
[22] PCT Filed: Sep. 8, 1989
[86] PCT No.: PCT/FI89/00168
   § 371 Date: Mar. 17, 1991
   § 102(e) Date: Mar. 17, 1991
[87] PCT Pub. No.: WO90/02854
   PCT Pub. Date: Mar. 22, 1990

[30] Foreign Application Priority Data
   Sep. 14, 1988 [FI] Finland .................. 884176
   Jul. 7, 1989 [FI] Finland .................. 893330

[51] Int. Cl.$^5$ .............................................. E04B 1/49
[52] U.S. Cl. ........................... 403/403; 403/405.1; 403/283; 411/466; 411/463; 52/DIG. 6; 52/693
[58] Field of Search ............... 403/403, 283, 405.1, 403/382, 231, 384; 411/466, 467, 468, 465, 464, 463, 462, 461; 52/DIG. 6, 693, 694, 695; 29/897.31, 897.34, 432

[56] References Cited
U.S. PATENT DOCUMENTS
| | | | |
|---|---|---|---|
| 529,993 | 11/1894 | Allen | 403/403 |
| 1,697,456 | 1/1929 | Carlson | 411/461 |
| 1,856,030 | 4/1932 | Loeffler | 52/DIG. 6 X |
| 3,212,389 | 10/1965 | Sanford | 411/465 |
| 3,347,126 | 10/1967 | Templin et al. | 411/463 |
| 3,377,905 | 4/1968 | McAlpine | 411/468 |
| 4,157,676 | 6/1979 | Jureit | 411/458 |
| 4,165,672 | 8/1979 | Jureit et al. | 411/461 |
| 4,167,090 | 9/1979 | Sanford | 52/641 |
| 4,442,649 | 4/1984 | Birckhead et al. | 52/693 |
| 4,562,683 | 1/1986 | Gottlieb | 52/693 |
| 4,734,003 | 3/1988 | Smith et al. | 403/283 X |
| 4,737,060 | 4/1988 | Birckhead | 411/468 |

FOREIGN PATENT DOCUMENTS
| | | |
|---|---|---|
| 260711 | 7/1965 | Australia . |
| 1062870 | 9/1979 | Canada .................. 52/693 |
| 1534699 | 3/1970 | Fed. Rep. of Germany . |
| 1905236 | 8/1970 | Fed. Rep. of Germany . |
| 821028 | 10/1983 | Finland . |
| 2048409 | 3/1971 | France . |
| 2424380 | 4/1979 | France . |

OTHER PUBLICATIONS
Finnish Model 960/81—"Hak. saap.pv–Ans. ing.d. Dec. 14, 1981".

Primary Examiner—Randolph A. Reese
Assistant Examiner—Harry C. Kim
Attorney, Agent, or Firm—Larson and Taylor

[57] ABSTRACT

A connector plate is provided which includes a plurality of connecting prongs which are, in use, pressed into wooden members to form a joint and which include at least one row of edge prongs that is folded down from the edge of the plate and that extends parallel to the longitudinal axis of the connector plate. A joint formed by a chord member and at least two abutting diagonals is connected together by connector plate which has a prong density that is asymmetrical with respect to longitudinal axis of the plate and has increased prong density at one side thereof. A joint structure provides a stiff, nonplastic joint.

4 Claims, 1 Drawing Sheet

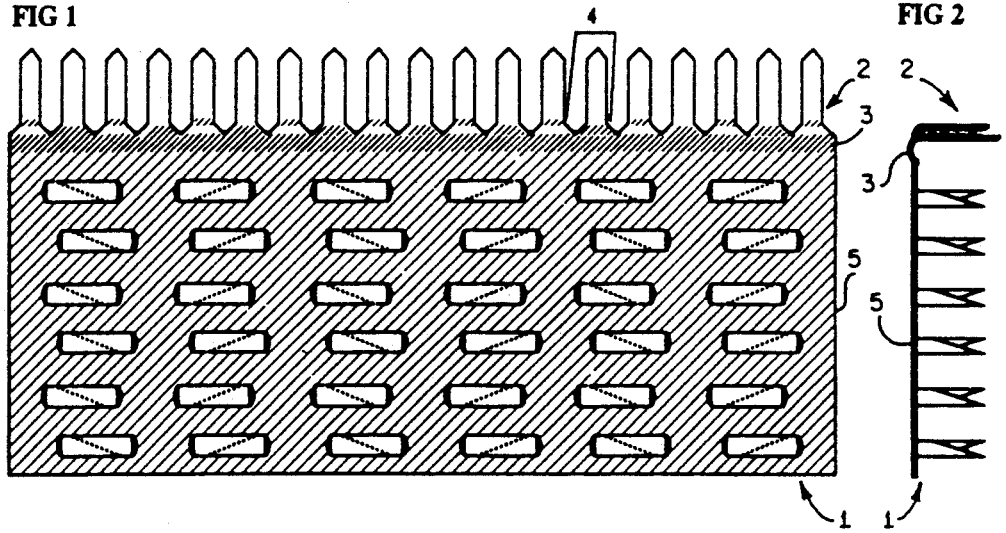
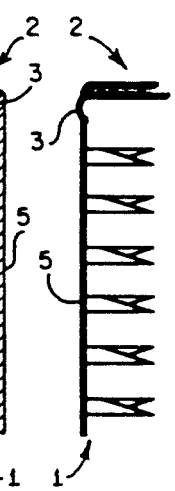
FIG 1
FIG 2
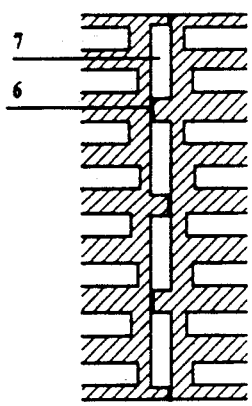
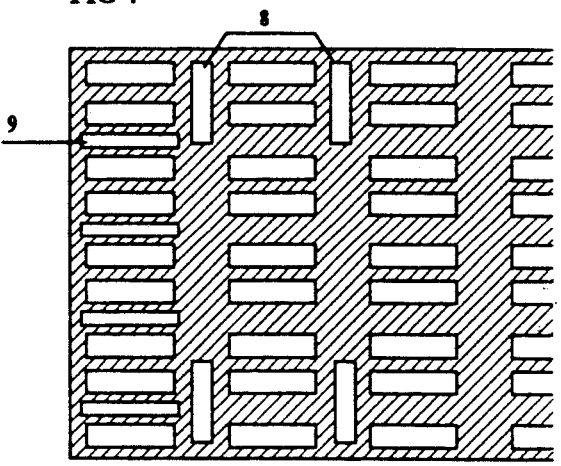
FIG 3
FIG 4
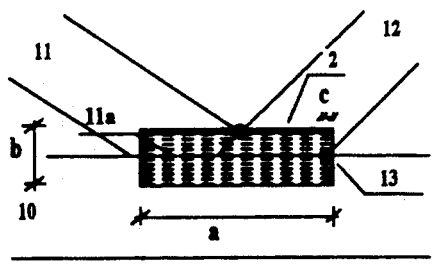
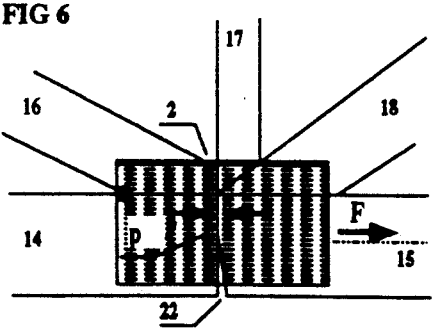
FIG 5
FIG 6
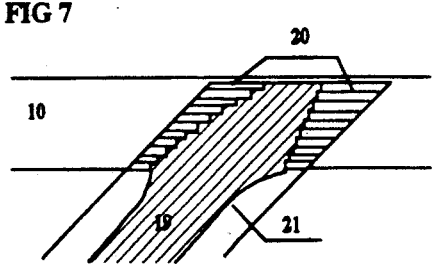
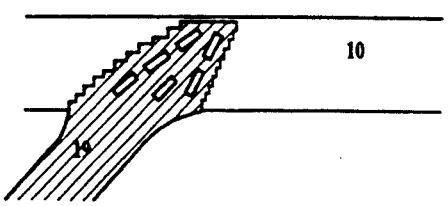
FIG 7
FIG 8

CONNECTOR PLATES, CONNECTOR PLATE JOINTS AND CONNECTOR PLATE STRUCTURES

BACKGROUND OF THE INVENTION

The present invention relates to connector plates which are metallic timber connecting plates generally made of zinc-coated thin steel plate and which are manufactured by punching prongs from the plate turned to an angle of approximately 90 degrees and which plates, as compressed against wood, provide a force-transmitting joint. This type of timber connecting plates were mainly developed in the 1950's and those were followed by a plurality of different connector plate designs. They differ from each other mainly in terms of the type of prong and the shape, size and pattern of a slot left in the plate by a prong. The primary utility criterion of various connector plates has been strength which has meant adhering strength or maximum lateral resistance strength transmitted by a plate surface to a wood surface and plate failure strength, i.e. the capability of a connector plate of not tearing along a seam when exposed to a tensile or shear stress. The plate failure strength may also relate to a plate buckling strength, i.e. the ability of a plate to transmit a compression force across a seam. The invention relates also to a connector plate joint which is a timber joint produced by means of a connector plate and to a connector plate structure which is (at least partially) a (timber) structure assembled by using connector plates.

The present-day approach is typically partial optimization evidenced e.g. by the fact that, when studying, analyzing or dimensioning a joint, the mere joint has been examined separately from the assembly as a whole, whereby the selected solutions have not often led to favorable overall results.

SUMMARY OF THE INVENTION

This invention relies on comprehensive thinking associated with novel connector plate technology, new requirements and qualities for a connector plate, connector plate joint and the entire connector plate structure resulting therefrom. The invention defines novel qualities for a connector plate which qualities can only be obtained by providing a connector plate essentially superior to those available at present. In short, this novel connector plate can be characterized as a moment-resistant and rigid plate while the present-day plates are mainly designed to provide a maximum failure load in a joint stressed by a force alone.

Accordingly, the novel characteristics and novel types of joints are determined for a connector plate joint. These can be characterized as large in terms of geometrical size, wood-saving and regulating a distribution of stress by means of joint design (e.g. eccentricity) as well as relying on the combined effect and simultaneous consideration of the geometry and disposition of a timber element as well as the size and disposition of a connector plate while the present-day joints are mostly hinged joints transmitting force stresses (not moment stresses), the aim being to make them as small as possible.

Accordingly, the invention relates to a novel type of connector plate structure which is an intermediate between a truss and a beam or a truss and a frame while the available connector plate structures can be characterized as mere trusses or frames with hinged joints. The final result differs significantly from the prior art e.g. in three respects:
I) With novel structural designs the prior art basic solutions (e.g. a given geometric shape and load of a connector plate structure) can be realized more economically than before. Thus, the term economy relates to the sum of timber, joints and manufacturing costs which may even result in a more expensive joint (connector plate).
II) Structural designs may include such solutions which have not been possible earlier due to the lack of technical characteristics (i.e. mainly due to the lack of connector plates set forth in the new claims).
III) The structures are functionally more reliable, both strength and deflection can be controlled with less deviation. This leads to a more reliable end result and yet to material savings, especially savings in wood consumption.

An essential aspect of the invention is the transfer of moment loads through a connector plate joint (contrary to the present concept, e.g. connector plate testing and dimensioning practice). According to novel thinking, a moment transmitting through the joint cannot be completely avoided even if the joint is intentionally designed as a hinge. One basic aspect of the invention is to accept the presence of this moment, to consider its effects on a connector plate and a joint and, particularly, to even control its magnitude in a manner that, if a greater moment in a joint is preferable in view of the overall structure, the joint will be designed capable of bearing a greater moment. A good final result is generally achieved by attempting to reach a substantial or complete rigidity in a joint. This is contrary to the present-day practice since at present the joints are contemplated as hinged structures and/or dimensioned separately without any links to the overall structure e.g. in terms of stress distribution and demands set on connector plates and joints.

The invention introduces the means, insights and combinations of detailed solutions which in terms of the above-mentioned overall economy provide a favorable final result.

The new way of thinking and this invention involve the following characterizing features:

In addition to force, the joint of a connector plate and timber characteristically withstands also a moment stress and is rigid (the present-day practice is only based on strength relative to force and neither displacement, i.e. rigidity, nor the capability of withstanding a moment have not drawn any particular attention). This means that the connector plate has following qualities:

Connector plate prongs should be located in peripheral areas of a connector plate since here they accommodate moment stresses most effectively for the simple reason that the moment-bearing ability of a joint is essentially based on a rotational difference between a connector plate and timber. In rotation, the peripheral prongs serve effectively and the prongs at and near the center of rotation are ineffective. In the available connector plates, the prongs are evenly distributed over the areas of an entire connector plate. In some cases, however, the connector plates used in splice joints may have had a wider-spaced prong pattern in the central area for increased steel strength but these connector plates cannot achieve the above-discussed moment strength and rigidity, such connector plate being disclosed e.g. in the protected Finnish design No. 960/81.

The surface area common to a connector plate and a timber element underneath is intended to have a geometric shape as elongated as possible, i.e. as far from circular or square shape as possible, at least when designing a joint utilizing the special features of this invention. This is contrary to general practice today.

The connector plate is provided with prongs positioned at an angle to each other clearly deviating from zero, preferably at approximately right angle. The available connector plates are designed to be strong in one direction only, in the so-called main direction, in which direction the slots or openings left by the prongs are extending. This has been sufficient since, according to the prior art considerations, the force acts in a joint in one direction only and the object has been to dispose a plate in accordance with this direction. The stresses in a moment-subjected joint are distributed in a plurality of directions and, thus, a connector plate should be both rigid and strong in all (or as many as possible) directions.

Embedding the prong of a connector plate in timber is made effective. In this respect, the available connector plates are of poor quality in case the plate main direction and wood grain direction coincide or run nearly parallel to each other, since the compression strength of wood is often insufficient to withstand the resistance of prongs to be pressed in wood. In practice, this problem is only encountered in the central area of a joint between a connector plate and a timber element. This problem is substantially eliminated since in the novel type of connector plate the prongs typically extend in a direction partially perpendicular to each other and the prongs are patterned more densely in the peripheral areas.

In view of the moment-bearing ability of a connector plate joint it is necessary that also a connector plate (metal) be sufficiently strong to bear the (additional) stresses induced by the moments. This means that a connector plate should possess the following qualities:

The moment-induced stresses in a plate joint are characteristically asymmetrical, and although a moment virtually always occurs with a characteristically symmetrical force, the combined effect is asymmetrical, i.e. one of the peripheries of a connector plate has significance in terms of strength. Thus, it is preferable that also the connector plate be asymmetrical as for its (metal) strength. The available connector plates are symmetrical in terms of metal strength. By virtue of asymmetrical connector plate strength, the strength of a connector plate in a moment-subjected joint can be substantially increased simply by leaving a non-slotted or sparsely slotted zone on one side of a connector plate. The above-described asymmetry is one of the essential aspects of the invention.

The cross-section between the slots in a steel connector plate is great compared to the overall cross-section, i.e. the degree of effectiveness is high. This is achieved with conventional techniques e.g. by punching a plurality of prongs from a single slot and by having a short prong length.

The plastic deformation (yielding of metal) of a connector plate joint is not allowed. Denial of the plasticization of a connector plate is in contradiction with the current practice since the current practice of dimensioning utilizes the higher connector plate strengths provided by plasticization both in connector plate testing and dimensioning, whereby the reference values used in planning for the strength of a connector plate are high, as result of which the connector plates can be made small. The fact that the advantages offered by plasticization are neglected means also that the drawbacks associated with plasticization are avoided, including particularly extra stresses created in timber and/or a distribution of stress unfavorable in terms of the structure as a whole, i.e. this brings forth other advantages which prove to be multi-dimensional and are considerably more significant than the drawbacks. This is one of the essential aspects of the invention. The per se known means for preventing plasticization include e.g.:

Metal has high strength.

Necks between the slots are sizable and a plurality of prongs are punched from a single slot for the effect "one high beam withstands a moment better than two low ones".

The degree of effectiveness in central areas is high since generally only the central area of a plate lies at a seam and thus metal strength is only required in central areas (both in lengthwise and crosswise direction). With a plate of the invention this effect is achieved without problems as there are also other reasons why the prongs otherwise in the central area are preferably shifted into peripheral areas.

The compression of wood and the incomplete immersion of a connector plate in wood is prevented. If a prong is not completely embedded in wood, i.e. down to its base, the prong is more susceptible to deflection and is also substantially poorer in strength and rigidity. This is typically realized as follows:

The prong density is sparse in the central area where the compression of wood mainly occurs.

The prongs in a connector plate are partially perpendicular (or at least non-parallel) to each other resulting in a lesser compression since, in practice, compression only occurs in case that the plate extends in the direction of wood grains (i.e. the principle direction of a connector plate prong is perpendicular to wood grain direction).

The prongs are in a more dense pattern in the peripheral area of a connector plate where there is less (or not all) compression.

The connector plate joint is designed in a manner that the common surface (gripping surface) between a timber element and a connector plate is elongated, since this provides the best possible rigidity and offers the following advantages:

An elongated joint can be used to achieve a remarkable conservation of wood by sawing the end of a timber element in a single-cut or nearly a single-cut fashion. Thus, a single plank can be used to saw wood elements to be used in the structures, the added dimension of said elements exceeding the length of the original plank since in sawing the ends may go overlapping.

A lengthwise joint is preferred in view of the shear strength of a connector plate since the object of the invention are best achieved with a large-size connector plate which must be thin in order to save material. In a thin connector plate the shear strength is low, and although it can be increased to exceed conventional with the above-described means, an essential aspect of the invention is that the metal does not plasticize which means that a strengthening effect produced by plasticization cannot be utilized for achieving the objects of the invention and, thus, the connector plate has a relatively low shear strength. In a long joint the shear stress is also low and thus a thin and non-plastic plate does not cause problems.

In a lengthwise joint, the length of a joint area relative to that of a chord is great. Thus, the free (unsupported) opening span is reduced and also the opening moment and buckling length are reduced. Even a slight reduction of the opening or bay size is of major significance, since both moment and buckling are proportional roughly to the second power of the length of a free opening or bay. By increasing the joint length in relation to the bay, there is ultimately achieved a beam or a structural configuration wherein the chord is entirely supported and which is preferred in view of the dimensioning of chords since the chords are (substantially) subjected to no moments at all and, in a typical case, the capacity (relative to normal force) increases to a double value. At present, the opening moment reducing effect caused by the size of a connector plate has not been considered, since there has been no way to achieve this. The means to achieve this are defined in this invention and that is one of the essential aspects of the invention.

A lengthwise joint is particularly effective in transmitting a moment. This provides the advantage that a possible moment of eccentricity on chords or a moment imbalance resulting from openings or bays of various lengths or some other reasons is distributed not only on chords but also on diagonals which generally have more capacity reserve relative to moment. Thus, stresses on chords are reduced and the chords can be made by using timber of smaller size or poorer quality and, in view of the overall assembly, even a minor saving in this respect is significant since the chord timber is usually the most expensive part of connector plate structures.

As the joints approach rigidity in their function, the structural configuration approaches a frame. Thus, the basic structural configurations are no longer restricted to conventional, generally truss forms. Thus, the web system and geometric configuration of a structure can be selected more freely.

If the size of a connector plate is elongated, it is ineffective as for the current dimensioning practice and connector plate types due to the tolerance reduction of a connector plate and the edge reduction of wood. Namely, the effective surface area only includes that section of a covering surface area between a connector plate and a timber element which is (depending on the case) at a distance of 5 ... 10 mm from the periphery of a timber element (edge reduction) and which is at a distance of 0 ... 20 mm from the periphery of a plate element (tolerance reduction).

If the prong distribution of a connector plate were uniform, the elongated effective surface area within a connector plate area would be highly unfavorable due to these reductions but, in a connector plate of the invention, the prongs are more densely located in the peripheral area of a connector plate. These reductions have no effect on peripheral prongs as they remain sufficiently far from the periphery of a timber element in substantially all cases.

The significance of edge reductions in a plate of the invention is lesser than in conventional plates since connector plates and joint surfaces are large in size, so a fixed reduction has relatively less significance.

It has already been described above that in a connector plate joint of the invention the joints are typically long for providing a better stress distribution on chord openings but in some cases the greatest stresses on chords may occur in a joint area. In these cases, it is preferable that the connector plate be sufficiently strong to strengthen the cord at a joint in a manner that a connector plate pressed in a chord serves as a local monolithic or substantially monolithic structural element for a chord and partially also for diagonals and verticals. Such function is not possible (practically not at all) if a connector plate undergoes plastic deformation since, although plasticization in a plate and a joint leads to strengthening e.g. in terms of shear strength, it simultaneously leads to weakening in terms of other strength qualities and/or rigidity. One essential aspect of the invention is that a connector plate retains its rigidity and elasticity when subjected to a load (in a dimensioning situation), whereby it strengthens the timber elements in a joint area and the chord is not dimensioned (most often in practice) at all in a joint area. This means that the strength of a chord is improved both in an opening and also on a support (i.e. at a joint).

Most of the available connector plates are designed either for roller pressing and/or direct (generally effected by hydraulic means) pressing. A problem in roller pressing is the overturning of prongs, so the prongs must be shorter than what would be preferred in view of strength. On the other hand, a problem in direct pressing is the prong density which is lesser than in roller pressing, since the compression of wood is more pronounced in direct pressing than in roller pressing. A connector plate of the invention typically includes prongs that are perpendicular to each other (or nearly perpendicular or at least extending in substantially different directions). The overturning of a prong only occurs in the narrower direction of a prong, not at all in the thinner, more rigid direction of a prong. A connector plate of the invention carries prongs in either direction and, thus, these divergent prongs prevent overturn of the prongs as a whole, whereby the individual prongs also remain upright in a pressing operation. Thus, even the connector plates used for roller pressing may have a relatively long prong length. Since divergent prongs are clamped more effectively in wood, the prong density can be higher also in directly pressed connector plates. The result is a connector plate, wherein the prong density can exceed that of the current plates and the prongs can still have a great length and, nevertheless, the connector plate is simultaneously suitable both for roller pressing and for direct pressing. This increases substantially the versatility of a connector plate as the available connector plates are designed either for roller or direct pressing or the plates compromised in this respect are ineffective in either mode of pressing. By virtue of the firm upright position of the prongs, a connector plate of the invention can also be secured by using a conventional hammer better than the current connector plates.

A connector plate of the invention is typically large in size. In order not to increase the costs of a joint too much, the connector plate must be thin. When making a connector plate thinner, a problem will be a sufficient plate failure strength (tensile, compression and shearing strength of metal). In this respect, it is particularly important to have as few slots as possible in the central area. For this reason it is particularly necessary to locate as many of the prongs (and also slots) in the peripheral areas of a connector plate.

Connector plates are generally manufactured by a punching technique with an eccentric press or the like, wherein the piercing of prongs is effected on a precision-cut metal strip usually with the intervals of circa 50 mm. Due to the current manufacturing technique it is very difficult to produce connector plates (e.g. a connector plate shown in Finnish Design registration No. 960/81) with varying prong density, since this would require various punch selections in various piercing operations. In this invention, a novel essential feature is to produce peripheral prongs at least partially by splitting and/or cutting a plate.

As for splitting, this technique is very effective since by splitting a single plate down the middle it is possible to obtain prongs on two plates simultaneously. At the same time, the plate is naturally asymmetric since this edge, which is cut into the form of prongs, can be free of other prongs in its peripheral areas so as to form a high-strength edge required by the asymmetry of plate strength. In the splitting, the metal used for prongs is located on the metal strip outside the final connector plate and the splitting prongs do not at all deteriorate the tensile, compression and/or lateral resistance qualities of a connector plate (unlike rest of the prongs).

The same principle can be applied to the cutting of a plate or the metal strip cutting tool can be fitted with punches which produce at the ends of a connector plate lengthwise or crosswise different prongs which are similar to other prongs.

In the longitudinal direction, the increase of the density of prongs can also be effected by varying the cycles of connector plate manufacturing.

If the peripheral prongs of a connector plate are made as described above in connection with a splitting and/or cutting operation, these prongs are dissimilar to the others. Therefore, it is preferable to make these (or at least some of these) longer than the rest of the prongs.

The long prongs improve the positioning of a connector plate in manufacturing.

They anchor a connector plate effectively in a timber element and, thus, rest of the prongs can be shorter.

In splitting, the prong density can be made very high which is highly preferable when this plate element is connected with diagonals and/or verticals which are often narrow in their joint dimensions and, because of a joint, they must be made wider and/or the plate must be positioned ineffectively so that a large part of it is supported by nothing, which is particularly expensive. By means of a connector plate and a joint of the invention this problem can be substantially reduced or, in some cases, it can be completely eliminated.

In a connector plate of the invention and in the production of trusses based thereon, a selection of connector plates required is smaller than what is needed at present. This is due to the fact that in a connector plate of the invention the strength properties are less dependent on various alternative dispositions of a connector plate with respect to force, seam and/or wood grain direction.

With a connector plate of the invention, the chord splice of a conventional truss can be connected with a joint better than before.

Tensile strength is often dominating in a joint, so the splice must have sufficient plate surface area. In a joint of the invention, the chord tensile strength is substantially increased for diagonals and verticals and this quality is achieved "free of charge".

A joint can be designed in a manner that its function, with the precision required by dimensioning, is the same as a joint provided with no splice. This results in a remarkable advantage that, although the joint has been provided with a splice at the designing stage, such splice can be omitted at the production stage without making a new design and drawing. This quality can also be applied in a manner that in a sketch the joint is not provided with a splice but the joint can be fitted with a splice at the production stage (by applying standard procedures which do not require re-planning) while maintaining the structure functionally unchanged.

Achievement of the object set forth in the foregoing paragraph requires a control of the compression forces partially by means of contact by utilizing so-called controlled contact and its realization in the present joint is particularly easy.

A connector plate of the invention is typically thin, whereby a connector plate prong is also small in its dimensions. This is an effective way of exploiting a known principle: a lot of small prongs is better than few large ones.

With a connector plate having a large surface area, it is better possible to control the positioning of a connector plate at joint edges so that the edge of a connector plate is positioned in the corner or at the edge of timber elements. This mode disposition can be followed either in one and/or both directions of positioning a connector plate.

This facilitates substantially the positioning of a plate since the currently used disposition of a plate indicated by a dimension line is unnecessary or an alternative way of positioning the present plate: centering of the position is substantially more accurate.

At present, connector plate manufacturing takes place in a horizontal position on a production jig, wherein a connector plate must be placed both on top of and below the timber elements. The current practice of positioning connector plates (e.g. the use of dimension lines) is particularly inconvenient in the bottom side plate. Measuring underneath the timber elements is difficult, since the plate can be completely covered by wood. In addition, the possible incorrect position is not detected until after the compression of a plate and manufacturing of a truss. By positioning the connector plates in the corners there is no need for measuring and a possible incorrect position of the plate is detected prior to the compression of a plate since even the bottom side plate is visible.

The connector plate can be extended slightly past the actual joint area defined by timber elements, since several advantages of the invention associated with the disposition of a connector plate (e.g. the effect of a joint to reduce stresses on the bays are retained even if a connector plate were partially "lying on nothing" (i.e. the forces transferring over a small gap, especially if a plate is profiled). This facilitates the production of single-cut plates substantially easier than at present.

In an effort to make connector plates with large surface areas but small thickness, there are problems occurring in compressed joints as well as in joints stressed by a major moment due to the poor buckling strength of a connector plate. In the current design practice, this problem has not been observed at all but it has been presumed that, as a plate buckles, the stresses transfer to between the timber elements joined by means of contact. However, this procedure involves a high risk of error since there may be a rather large gap between timber elements and, prior to making a contact, it may be necessary that the timber elements both rotate and shift substantially. This extra translational and rotational slip for closing a possible gap is highly detrimental as it is just like an extra load stressing the structure and it may have a major effect. These problems can be overcome by the following means:

Plate buckling occurs as a combined effect of normal force and moment, whereby it is asymmetrical in its overall effect, i.e. only one of the edges of a plate is essential in view of buckling strength and it would be preferable that the other edge were stronger. In a solution of the invention, such edge with more buckling strength is created conveniently by providing one of the intact strips of a plate with a reinforcement particularly in a manner that the tension resistant edge is also an edge with a particularly high compression strength.

The approach described in the preceding paragraph is not always sufficient in its effect and it involves the drawback that when transferring a major portion of (or the entire) force through a connector plate, the surface area of a connector plate must be large which leads to high plate costs and, in addition, the use of a large connector plate is not possible in certain cases, e.g. in a apex joint (when the pitch angle is large). Therefore, it is preferable to make use of contact. The most preferred way of doing this is that, when designing a joint, a choice is made whether to use or not to use a contact and, if contact is to be used, a joint is designed especially in terms of wood cutting so as to provide a contact between timber elements despite possible irregularities associated with wood cutting, whereby it is possible to eliminate a V-shaped gap most often present in a joint so that a contact is made at a location unfavorable in view of stresses. Thus, the cutting of timber elements can be used for controlling the location of a contact possibly obtained in a joint. This control of a contact is a novel method applied in the design and manufacture of connector plate structures which is one of the essential aspects of this invention. After determining the location of a contact by means of wood cutting, some irregularity in view of contact may be caused by the fact that, at the finishing stage of a connector plate structure, the surfaces intended to serve as contacting joint surfaces have a gap due to a manufacturing error. In practice, this situation occurs very seldom and it can be corrected with a piece of filling, adhesive mass or the like. The final result is a controlled structure whose operation is free of irregularities associated with current connector plate technology and of large scattering (e.g. in distribution of stress and deflection). Thus, in view of the current practice, the new technology has a novel, e.g. costs-incurring dimension since, because of the contact, the joints must be produced in a more complicated manner which is different from the current practice. The new technology divides the joints in two categories: a) those involving a contact and requiring special approach in designing, e.g. in drawings and manufacturing and b) other joints in which even large gaps can be tolerated without substantially deteriorating the strength and/or quality of a joint. The joints included in category b) are in practice highly advantageous as they speed up and simplify the manufacturing of connector plate structures and allow for totally novel types of manufacturing methods. Thus, even though the novel types of joints involve extra requirements in view of the current practice (as for contact joints), there are also improvements. In practice, the significance of improvements is superior since there are very few joints which require a contact. According to the current practice, all joints require (at least spot-like) contact, so in terms of manufacturing, the joints are quite inconvenient and, yet, do not provide a well and reliably operating structure (i.e. high strength and/or small deflection). Thus, the novel joints can be manufactured more economically but are still superior in view of the operation of a connector plate structure.

By making use of a contact and controlling its location it is also possible to have an effect on the center of a rotation (difference) acting in a wood-plate joint. Hence, a contact can be used to increase the moment bearing capacity of a joint not only in view of a moment associated with eccentricity but also because the connector plate-wood joint transmits a greater moment by virtue of greater rigidity.

The following explains some aspects of the invention which have at least indirectly become apparent from the above but are now considered in more detail because of their significance:

By virtue of the peripheral prongs and/or higher prong density in the peripheral area, a connector plate of the invention grips effectively in diagonals and verticals. Thus, it is possible to design a joint in a manner that the plate lies on top of timber with no portion of the plate extending beyond the edge of a timber (or extends only slightly beyond). This is of major importance when the joint is protected against fire as in this case the connector plates are provided with fire protection simply by nailing on top of the joint a board, a chipboard or the like or by nailing two or more trusses side by side. If the plate were to extend beyond a joint area, this type of fire protection is not possible since, if the plate extends beyond the edge of a timber, the plates are unprotected on the inside (on the prong side).

The available connector plate joints can only be pressed in dry timber, the highest acceptable timber moisture being circa 18 . . . 22%. This results in major practical problems since in a humid season or rainy weather the timber moisture can be much higher. If a connector plate is pressed in moist timber, the result will be three drawbacks: The joints cannot be made gapless since timber has expanded in moist conditions and shrinks upon drying and produces a gap in the joint even if the latter had no gap at the time of production. Due to the deformation of timber as a result of moisture, the joint has a lot less gripping strength than what is obtained when pressing it in regular dry timber. The deformation of a joint is significant. All or most of these problems are eliminated in a joint of the invention since the connector plate in a joint is large and has a minor gripping tension and, therefore, the reduction of gripping strength has no significance. In a structure of the invention, the joints are divided in two categories: those with a gap and those without. Most of the joints are provided with a gap and the gapless joints are designed in a manner that, when planning a joint, the contact develops at a certain location. According to the prior art practice, the contact develops at an indefinite location and the size of a gap may be a combined effect of incorrect sawing of timber ends, timber crooking, incorrect setting, and timber shrinking. Virtually all the above error factors are eliminated in the novel approach for the following reasons: A sawing error is not possible since timber is sawn on purpose so as to control the position of contact, so an error in sawing does not affect the final result. For the same reason the timber crooking has no effect on where the contact is made. The possibility of a setting error is also practically negligible since, in practice, the same joint always includes joints both with and without gaps. Joints with a gap allow space for timber setting, so that the joint sections with no gaps can be readily produced. In practice, the contact joints are exclusively compressed chord joints, wherein the wood grain extends in a direction perpendicular to a joint surface and, thus, the moisture deformation of timber is insignificant. Hence, the invention makes it possible to use in connector plate joints a kind of timber whose moisture fluctuation exceeds the present standards.

Explained above is that some of the connector plate prongs should be produced in the periphery of a plate, so that the prong does not make a hole in the plate and, thus, does not weaken the plate. This facilitates a high prong density and the use of steel is efficient since no steel is required around a prong (prong density and efficiency relative to conventional prongs punched out of the central area of a plate is in the order of 4 . . . 8 times higher). This offers a major benefit e.g. in joint design, material consumption of a connector plate. A particularly significant advantage is gained when there is a small contact surface between plate and timber. This type of case is e.g. a so-called metal diagonal, one example of which is disclosed in publication U.S. Pat. No. 4,562,683. Such jointing means are thus known per se and have typically an I-or V-shaped basic configuration, are provided at the ends thereof with connector plate prongs which are pressed in timber and include in their central section typically a profiling brace for added compression strength. In the prior known metal diagonals, the connector plate prongs are punched out of the central section of metal to produce a hole in the metal. Thus, the gripping between timber and plate is so minimal that it has been necessary to provide a large gripping area, which takes a lot of steel and the joint becomes eccentric and thus weak. A steel-saving, eccentricities reducing (or even eccentricity eliminating) and more effective metal diagonal is obtained when at least some or all of the prongs are punched out of the peripheral area. In addition, this procedure makes it possible to produce a metal diagonal in the same direction as a strip for an economical and simple manufacturing process. The available metal diagonals are produced from a wide strip, the diagonal being cut in the transverse direction of a strip. By virtue of an effective plate-to-timber gripping the angle between diagonal and timber may vary which is why a single diagonal can be used to manufacture beams of various heights.

Explained above is that a joint should generally be made as rigid as possible and also means for providing a rigid joint have been described above. An important special case is that, regarding at least the joints subjected to the most severe stresses, the joints are rigid to such an extent that they can be considered completely rigid e.g. in calculations.

At present, the connector plate structures are designed quite exclusively by first building a simplified model of the structure. This is used as a basis to solve stress factors and finally to select required timber cross-sections and qualities as well as to select the sizes and locations of plates by applying a criterion based on strength. The size and location of a plate are not considered as having effect on stress distributions. An approach of the invention is contrary to the present general practice as the structure is now selected prior to analysis relying essentially on criteria associated with production technology and intended final use. Unlike the present practice, the dimensioning need not rely on strength since the plate size and positioning can be used to control the distribution of stresses and the capacity of timber elements. Even though such procedure in view of the present practice does lead in some cases to increased joint costs (e.g. as a result of a larger and/or stronger plate), the total costs are nevertheless reduced.

BRIEF DESCRIPTION OF THE DRAWINGS

FIG. 1 is a plan view of one connector plate of the invention, the prongs being shown in non-folded condition as they cut out of metal.

FIG. 2 shows the connector plate of FIG. 1 in an end view, with connector plate prongs folded to the final position.

FIG. 3 shows a cutting principle for a strip of connector plate for producing prongs at the ends of a connector plate.

FIG. 4 shows another method of producing prongs at the ends of a connector plate in a cutting operation.

FIG. 5 shows a typical K-joint of the invention in a connector plate structure.

FIG. 6 shows a joint of the invention, the joint being provided with a chord splice.

FIG. 7 shows the application of the invention to a metal diagonal, the figure showing an unpunched and unfolded plate on top of a timber, the grey lines showing the points of folding and cutting.

FIG. 8 shows a diagonal of FIG. 7 pressed in timber.

DESCRIPTION OF THE PREFERRED EMBODIMENTS

Referring to FIG. 1, the connector plate is asymmetrical in the sense that an edge 1 can be regarded as a conventional connector plate side and it may comprise any prior known connector plate and an edge 2 which is provided with special features, e.g. the pressing of a larger plate and/or a side comprising tensile strength and/or a side with more effective timber gripping e.g. as a result of a higher prong density. In the case of FIG. 1, this side is provided with peripheral prongs that can be obtained two plates or some other way. In the illustrated case, the reinforcement edge is further provided with a bracing 3 for increasing compression strength (buckling strength). This may consist of one or a plurality of identical or different bracings and those can extend from the plate onto the prong side or opposite side.

Reinforcement can also be obtained in a manner that plate is double-folded on a reinforcing section and, if there are no peripheral prongs, the plate will thus be doubled and, if the plate has peripheral prongs, the plate will be doubled or tripled on the reinforcing section. If prongs are folded from the edge, it is preferable that the prongs thus obtained be not in the same line. This can be avoided simply by turning out the prongs partially from different points 4 or by cutting them to varying lengths. The crosswise direction of a connector plate or a strip cutting edge 5 is in the illustrated case without prongs resulting from cutting.

FIG. 3 illustrates the formation of prongs in the crosswise directions of two connector plates in connection with the cutting of a strip. Cutting can be effected by punching one or two prongs from a hole to produce a slot 7 at the point of cutting. Necks 6 between the slots can be cut by means of blade at the end of a punch. In the illustrated case, a neck 6 is alternately cut on either side, so each end of a connector plate will be provided with the same (or substantially the same) number of these special prongs. Alternatively, the cutting can be effected in a manner that the prongs produced by cutting will be on one side only, in which case the connector plate is asymmetrical also in the longitudinal direction in terms of its set of prongs. Such provision of prongs in the peripheral areas of a connector plate is particularly preferred since, as for cutting and piercing of prongs, this operation is very simple and the extra prongs do not deteriorate the steel qualities of a connector plate (except a negligible decrease in shearing strength) but the prongs provide all the above-described benefits.

FIG. 4 shows a means for providing prongs at the ends of a connector plate. The cutting tool can be fitted with punches for making holes 8 (one or more prongs from a hole). These holes, when placed in the corners and with necks at suitable spacings between the holes, do not deteriorate at all any of the steel qualities of a connector plate but they serve to provide valuable prongs in the peripheral areas with the above-described benefits. If the plate is provided with a peripheral reinforcement 2, said holes 8 can be on the reinforced side only, where they serve most effectively, or on either side. In the case shown in FIG. 4, the holes 9 in the main direction of a plate are punched between the holes otherwise formed in a plate manufacturing process. A problem here is the sufficient width for a web between the holes. This aspect can be improved in a manner that every other web or neck is made wider, sufficiently wide for punching the extra holes therein without (substantially) deteriorating the steel qualities. As the holes are made with a cutting tool, the result is very simple and preferable.

FIG. 5 shows a so-called K-joint between two diagonals and a chord 10. These diagonals are also referred to herein as diagonal struts and, more generally, as connecting members. Such a joint is traditionally made either by cutting both diagonals centrally or by dual cutting, so that the point of cutting lies on the center line of a rod or by cutting both rods in a single cut, whereby the joint is formed in a manner that a diagonal 11 joins the side of a diagonal 12, i.e. a cutting length 11a in FIG. 5 is 0. In a joint of the invention, however, the cutting of timber elements is effected in a single cut or nearly in a single cut in order to utilize overlapping of the ends in wood cutting. The connector plate is elongated as indicated by the ratio of the length a to the width b whereby the joining faces of connector plate and wood will also be elongated. Due to the large size of a plate, the connector plate can be placed in position in a manner that the edges find the corners of timber elements. Such corner disposition is designated by a point 13. This disposition may indicate that the edge of a connector plate is positioned in a corner, i.e. dimension c is zero, or preferably often that said dimension c has a standard value different from zero at least in the direction of a chord. In this case, the connector plate is namely longer and its effect for supporting a chord opening extends further. In addition, the joining face to a diagonal strut 12 is longer. In the illustrated case, on the other side (left side) of the joint said plate does not extend over the corner of a timber element, this being preferred depending on the case, since on the other opening the stresses can be lesser and there is no need to utilize the effect of a joint improving the bay dimensioning. In addition, the connector plate must have a balanced position relative to diagonals, e.g. surface areas and moments occurring between plate and diagonals do not always require the extension of plate over the edge but, as a standard solution, it is preferred that one side of a plate be extended slightly over the corner. A presumption in this case is that a connector plate is provided on reinforced edge 2 with peripheral prongs produced in a splitting operation. When the plate is placed in a manner that these prongs are on the side of diagonals 11, 12, they function effectively and their effective function is not affected by reductions associated with timber periphery and/or plate tolerance. By virtue of a high prong density in the peripheral area, the diagonal width need not be increased because of a joint, nor is it necessary to extend the plate over the timber section because of diagonal strengths. The connector plate can be aligned in a corner in a lateral direction, as shown in the figure, or the positioning can be effected according to the current practice by using dimension lines or the like.

FIG. 6 illustrates a joint in which a chord splice is fitted in a conventional E-joint. The chord can be compressed or tensioned, the tension case being studied first. In a preferred case, the joint should have a negative moment on the chord strut (i.e. a moment which in the illustrated case causes tension in the upper surface), since this serves to provide a balanced distribution of stress as the loads are virtually always evenly distributed and result in a favorable bay moment. This negative support moment is produced simply by placing a connector plate eccentrically relative to timber elements. This is illustrated in the figure by an arrow F which demonstrates a resultant of gripping forces between timber and connector plate. When this resultant is above the center line of timber (shown with dot-and-dash line), there will be a negative moment whose magnitude can be regulated with the disposition of a plate. This is highly preferably since this moment does not induce extra stresses on a plate caused by rotation and, in addition, this moment is not susceptible to the dying effect of moments based on a rotation difference. When a joint is tensioned, a connector plate does not often have a sufficient strength by conventional means to transmit the tensile forces. In the case of FIG. 6, a tensile force receiving surface in the joint of a connector increases in the joint areas of diagonals 16, 17 and 18 and, in addition, the upper edge can be a reinforced edge according to this invention. This increase and reinforcement of the edge has exactly the correct position in terms of stresses and, thus, it is obtained in extension dimensioning "free of charge", whereby the joint is substantially superior to the current solution: a separate splice as well as diagonal-vertical joint, and also more reliable as the joint moment can be adjusted, the moment is not susceptible to dying and the joint has sufficiently steel surface.

If a joint is compressed (i.e. arrows p in FIG. 6 are in the opposite direction and the case must be studied upside down, since in practical structures the compression joints are located in upper chords), all of the above-described benefits of a tensile joint apply since, in any case, the plate withstands a buckling load considerably less than tension, most of the compression force must be transmitted by means of contact. In this case, it is important that this contact force is also defined in its position, since in this the contact must made with the upper surface in order to make the distribution of moment beneficial in view of chord dimensioning. This can be accomplished simply by recessing a lower 22 of one end of a chord, whereby a contact, caused e.g. by irregular sawing, cannot occur in the lower periphery which, in the illustrated case, would be highly unfavorable. Another, more preferred and in most cases, sufficient means for controlling the position of contact is that an extra cut is not made for contact (as done with strut 15 in FIG. 6) but, instead, the joint is made V-slotted in a manner that the contact is placed in the other edge of a joint which is beneficial in view of the entire structure. Thus, the extra work required by the contact control is negligible.

The above-described control of the disposition, size and contact of a connector plate can be analogically used in other types of structures as well and one of the essential aspects of this invention is the application of this novel planning and joint designing principle. FIGS. 7 and 8 show an application of the invention in a metal diagonal 19 which is pressed in a timber element 10. FIG. 7 illustrates an unfolded and unprofiled plate with the grey lines showing prong cutting points 20 and a mid-section folding 21. FIG. 8 illustrates a diagonal pressed in timber, further including conventional prongs in its central section. In the case shown in the figures, the peripheral prongs are produced directly by folding and cutting the edge of a plate. This provides a particularly high prong density, in the order 8 times higher if compared to conventional prongs punched out of the central section. The same basic solution can also be applied in a conventional connector plate and, depending on the type of timber and/or the characteristics of a plate, the peripheral prongs can also be produced by cutting as shown in FIG. 1. In the case shown in the figures, the metal diagonal is manufactured from a narrow metal strip which facilitates a particularly economic way of manufacturing. Alternatively, the diagonal can be manufactured from a wide strip in a conventional fashion.

I claim:

1. A connector member having edges and a longitudinal axis, said connector member being asymmetric with respect to said longitudinal axis and comprising a plurality of connecting prongs which are adapted to be pressed into wooden members to form a joint, the improvement wherein the connector member comprises at least one row of edge prongs which is folded down from an edge of the connector member so as to enable pressing thereof, in use, into a plurality of wooden members to form a joint and which extends substantially parallel to the longitudinal axis of the connector member, said edges including a pair of longitudinal edges and said connecting prongs of said connector member being formed at only one of said longitudinal edges of said connector member.

2. A joint comprising a chord member and at least two diagonal members in abutment therewith and a connector plate including a plurality of connecting prongs formed therein for joining the chord member and the diagonal members, the connector plate having a longitudinal axis and two longitudinal sides, the improvement wherein the connector plate has a prong density of which is asymmetrical with respect to the longitudinal axis of the connector plate and has a greater prong density on one longitudinal side thereof than the other and wherein the connecting prongs of said one said are pressed into the surface of the diagonal members.

3. A joint as claimed in claim 2 wherein said connector plate is sized and disposed relative to said members such that the connector plate does not extend beyond the edges of the members and such that all of the connecting prongs of said connector plate are pressed into said members.

4. A connector member having edges and a longitudinal axis, said connector member being asymmetric with respect to said longitudinal axis and comprising a plurality of connecting prongs which are adapted to be pressed into wooden members to form a joint, the improvement wherein the connector member comprises at least one row of edge prongs which is folded down from an edge of the connector member so as to enable pressing thereof, in use, into a plurality of wooden members to form a joint and which extends substantially parallel to the longitudinal axis of the connector member, said edge prongs having a root area having a stiffness and including a common continuous root portion folded down from said edge and extending continuously along said edge so as to increase the stiffness of the root area of the prongs.

* * * * *